July 12, 1938.  A. L. KELTNER  2,123,783
CONNECTING DEVICE
Filed May 5, 1937  2 Sheets-Sheet 1
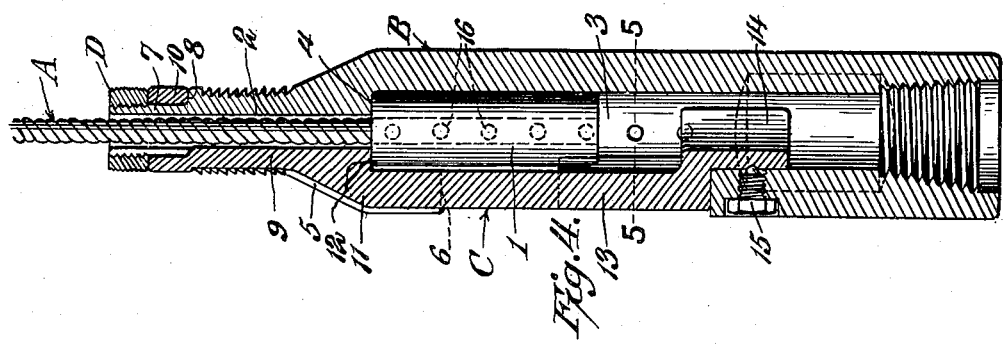
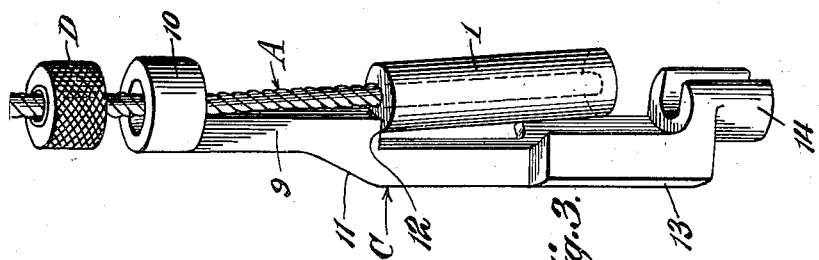
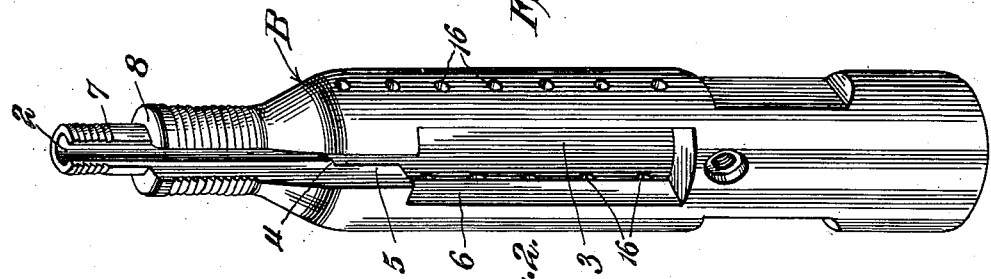
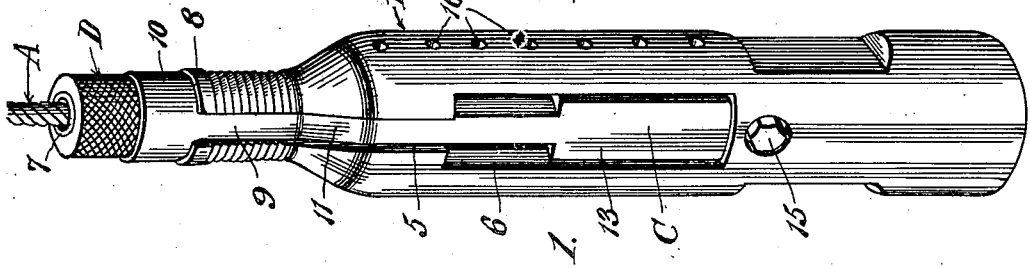
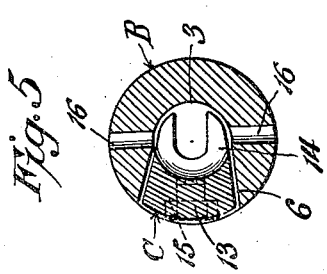
Inventor,
A. Lea Keltner.
By Baldwin & Wight
his Attorneys

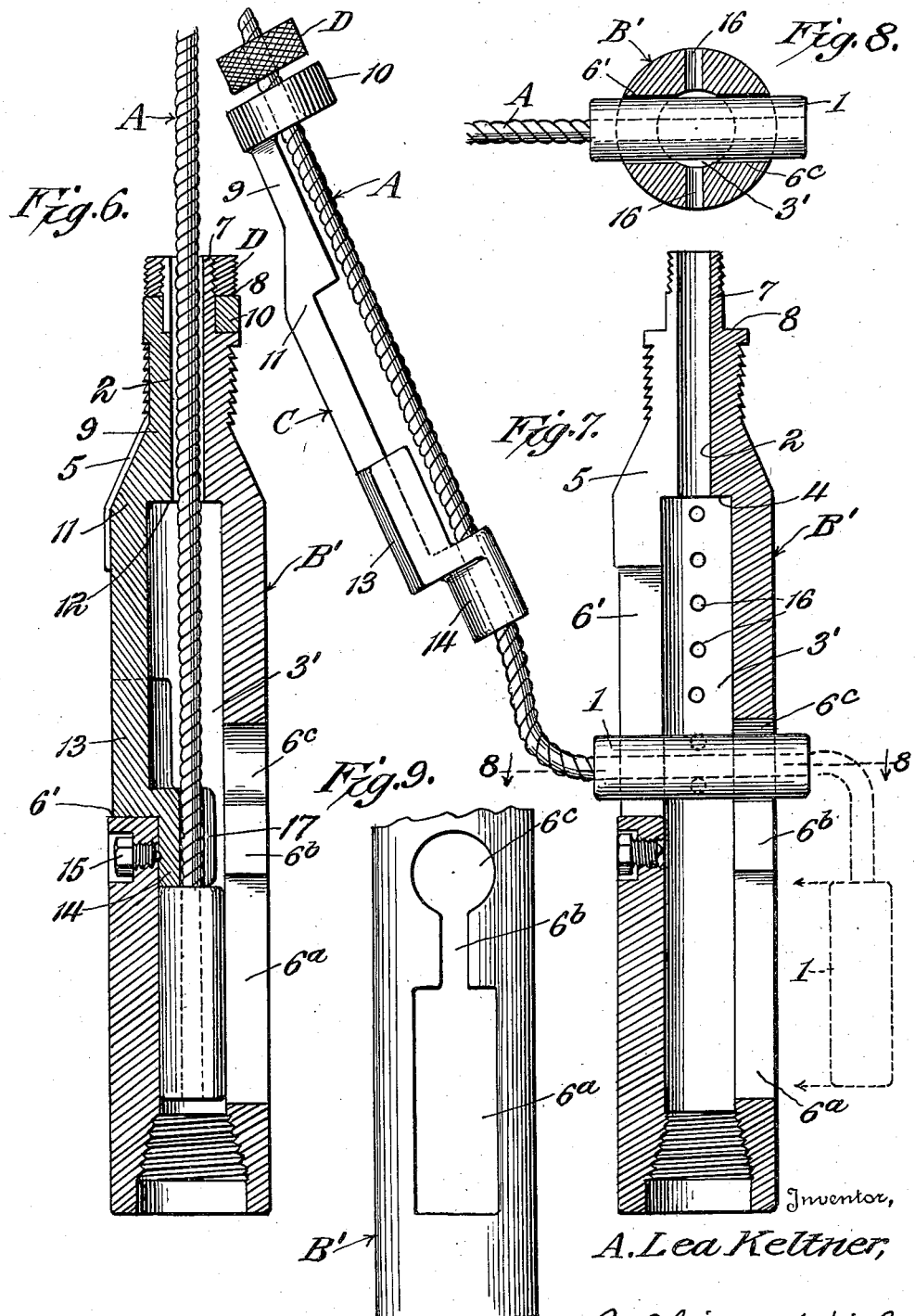

Patented July 12, 1938

2,123,783

UNITED STATES PATENT OFFICE 2,123,783

CONNECTING DEVICE

Amos Lea Keltner, Hutchinson, Kans.

Application May 5, 1937, Serial No. 140,956

12 Claims. (Cl. 24—123)

This invention relates to devices for connecting ropes, cables, or like elements to other members generally, and more particularly relates to devices for detachably connecting the ends of ropes or cables to various tools or working equipment such, for example, as well drilling, baling, or pumping tools or equipment.

Devices embodying the invention are adapted for quite general use, but for the purposes of illustration an embodiment particularly suited for well work will be described. In the oil industry many equipment manufacturers build winches of the single drum type for performing different operations. To perform the various operations requires the use of different tools, such as drills, spudders, and bailers. Since such tools must be connected and disconnected interchangeably to the rope or cable running from the single winch, it is desirable to provide a device for selectively and easily connecting the rope or cable to any one of a plurality of tools.

An object of the present invention is to provide a device of the kind referred to embodying certain structural and functional improvements over devices heretofore provided for the same and similar purposes.

Another object is to provide a device of the character referred to in which the parts are so constructed and arranged as to effect a strong and safe connection between the rope, cable, or the like and the tool, the arrangement being such, however, as to permit quick and easy disconnection of the tool from the rope or cable.

A further object is to provide such a device including a tool-attached body part adapted to receive the cable or rope end and a retaining means for maintaining the rope or cable releasably connected to the body part, the retaining means having an eye, collar, loop, or the like surrounding the rope or cable for preventing separation of the retaining member from the rope or cable when the latter is disconnected from the body.

Other objects will become apparent from a reading of the following description, the appended claims, and the accompanying drawings, in which:

Figure 1 is a perspective assembly view of a device embodying the invention;

Figure 2 is a perspective view of the body part of the device;

Figure 3 is a subassembly view in perspective showing a cable and retaining means;

Figure 4 is a longitudinal sectional view of the assembly shown in Figure 1;

Figure 5 is a transverse sectional view taken on the line 5—5 of Figure 4;

Figure 6 is a central vertical sectional view of a modified form;

Figure 7 is a view similar to Figure 6, but showing certain parts in detached relation;

Figure 8 is a section taken on the line 8—8 of Figure 7; and

Figure 9 is a fragmentary view of a body member in side elevation.

For the purposes of illustration, a preferred embodiment of the invention is shown in association with a flexible cable A which may be desired to be connected to a selected one of a plurality of tools. The cable is provided adjacent its connection end with an enlargement, in this instance a cylindrical anchor piece 1 babbitted or otherwise securely attached to the cable.

Generally stated, the connecting device includes a body part B adapted to receive the cable and enlargement 1, a member C for retaining the cable and enlargement connected to the body, and means D for securing the retaining member to the body. In use, a plurality of similar body parts B are employed, each being more or less permanently connected to one of a plurality of tools desired to be connected interchangeably to the cable A. The arrangement is such that the securing means D and the retaining member C can easily be detached from the body connected to one tool and then attached to the body member connected to another tool. In accordance with a feature of the invention, the cable is threaded through the securing means D and the retaining member C so as to prevent their being dropped or lost when changing from one tool to another.

In the form shown in Figures 1 to 5, inclusive, the body B is of generally cylindrical form and is provided with a longitudinally extending passage or bore 2 adapted to accommodate the cable A as shown most clearly in Figure 4, the body also being formed with an enlarged recess or chamber 3 adapted to receive the enlargement 1 at the connection end of the cable. At the junction of the longitudinally extending passage 2 and the chamber 3, the body is formed with a shoulder or abutment 4 which serves as a seat for the enlargement 1 when the latter is in the position shown in Figure 4 and the cable A is under tension. In order to permit the cable and enlargement to be introduced into the body laterally, the body is formed with a longitudinally extending slot 5 providing a lateral opening communicating with the passage 2 throughout the length thereof and with an enlarged lateral opening 6 adapted to permit passage of the enlargement 1 into the chamber 3. The body furthermore is provided with a threaded shank 7 adjacent the end of the passage 2 remote from the chamber 3 and with a shoulder 8 at the inner end of the shank.

In use, the various tools which are to be used in connection with the cable A are each provided with a body such as the body B hereinbefore described. When it is desired to use any particular tool with a body B connected thereto, the cable is introduced laterally through the slot 5 into the passage 2, and simultaneously the cable enlargement 1 is moved laterally through the opening 6 into the chamber 3.

The retaining member C is provided for retaining the cable and cable enlargement in the passage 2 and the chamber 3 respectively. In the form shown, the retaining member includes a shank 9 having at its upper end a collar or eye 10 adapted to surround both the cable A and a portion of the body B. The shank 9 is offset laterally as at 11, and adjacent the offset is formed with a shoulder 12 adapted to align with the shoulder 4 of the body B as shown in Figure 4, the arrangement being such that the shoulders 4 and 11 conjointly receive the thrust of the enlargement 1 when the cable is under tension. At its lower portion the shank is widened as at 13 so as substantially to span the lateral opening 6. The extreme lower part of the retaining member is provided with a projection 14 adapted to abut the inner wall portion of the chamber 3 adjacent the bottom of the lateral opening 6. When connecting a body B to the cable A, the cable and enlargement 1 are positioned within the body portion, as previously described, and the retaining member is inserted first in a position somewhat above the position shown in Figure 4 so as to permit the projection 14 to move in through the lateral opening 6. Thereafter the retaining member C is moved downwardly of the body until the projection 14 is in the position shown, and the collar 10 is over the shank 7 of the body in surrounding relation thereto. In order to secure the retaining member to the body so as to prevent displacement of the cable from the body, the securing means—in the form shown, a nut D—is engaged with threads on the shank 7 and screwed down tight so as to clamp the collar 10 against the shoulder 8 at the bottom of the shank. A set screw 15 having threaded engagement with the body B below the lateral opening 6 may be screwed into contact with the projection 14 for still more firmly securing the retaining member in place.

It should be noted that the enlargement 1 is of greater diameter than the openings in the collar 10 and the nut D, so that, when the retaining member, the nut D, and the cable A have been detached from a body B, preparatory to being connected to another body, it is not possible for the retaining member or the nut to slip off the cable. For this reason dropping or loss of the retaining member and the nut is prevented.

If desired, the body B may be formed with a plurality of sand-release holes as shown at 16 for permitting the escape of earth, sand, slime, or the like from the chamber 3, and thereby insuring a clean seat for the enlargement 1 so as to facilitate swiveling of the body with respect to the cable A.

The embodiment of the invention shown in Figures 6, 7, 8, and 9 is particularly adapted for use in connection with sand pumps or bailers, wherein it is desired that the tool swivel freely with respect to the cable. In this form, the body B' is generally similar to the body B, previously described, but is elongated somewhat to provide a long chamber 3'. Adjacent its upper end, the body is formed with a lateral opening 6' and in the opposite side of the body there is formed a lateral opening 6ª which extends down to a point adjacent the lower end of the body and which has a narrow upward extension 6ᵇ terminating in a widened portion 6ᶜ which overlaps and is disposed substantially opposite the lateral opening 6'. The openings 6ª, 6ᵇ, and 6ᶜ, together constitute a lateral opening in staggered overlapping relation to the opening 6'. In use, the enlargement 1 is threaded through the opening 6' across the chamber 3' and thence through the widened portion 6ᶜ of the lateral opening 6ª, as shown in Figure 7. After the enlargement 1 has been passed completely through the widened opening 6ᶜ it is inserted back through the lower part of the lateral opening 6ª so as to bring it into the position indicated in Figure 6. Thereafter, the retaining member C is secured in position as described in connection with Figures 1 to 5. The projection 14 on the retaining member is positioned in axially spaced relation to the longitudinal passage 2 and is formed with a slot 17 which accommodates the cable directly above the enlargement 1. With the parts assembled as shown in Figure 6, the projection 14 serves as a bearing for cooperation with the top surface of the cable enlargement 1. It is apparent that this arrangement locks the cable and enlargement in place without any binding, so as to permit free swiveling of the tool with respect to the cable, yet assuring against accidental disconnection of the tool from the cable.

The device shown for the purposes of illustration is a practical and the now preferred embodiment of my invention, but it will be understood that the construction and relative arrangement of the parts may be modified somewhat without departing from the invention as defined in the claims.

I claim:

1. A connecting device for a rope, cable, or the like element having an enlargement at its connection end, said device comprising a body formed with a longitudinal passage for accommodating the end portion of said element adjacent said enlargement, a chamber for receiving said enlargement and a lateral opening through which said enlargement can be introduced into said chamber; a retaining member for closing said lateral opening and having a collar surrounding a portion of said body; and means cooperable with said collar and said body for clamping said collar to said body and thereby securing said retaining member in position and closing said lateral opening, there being an abutment in said device cooperable with said enlargement when said element is under tension.

2. A connecting device for a rope, cable or like element having an enlargement at its connection end, said device comprising a body formed with a longitudinal passage for accommodating the end portion of said element adjacent said enlargement, a chamber for receiving said enlargement and a lateral opening through which said enlargement can be introduced into said chamber, said body having a shank at the end of said passage remote from said chamber, said shank being of less diameter than the adjacent portion of said body and forming therewith a resultant shoulder; a retaining member for closing said lateral opening and having a collar surrounding said shank; and means cooperable with said collar and said body for clamping said collar against said shoulder and thereby securing said retaining member in position and closing said lateral opening, there being an abutment in said device cooperable with said enlargement when said element is under tension.

3. A connecting device for a rope, cable, or like element having an enlargement at its connection end, said device comprising a body formed with a longitudinal passage for accommodating the end portion of said element adjacent said enlargement, a chamber for receiving said enlargement and a lateral opening through which said enlargement can be introduced into said chamber, said body having a threaded shank at the end of said passage remote from said chamber, said shank being of less diameter than the adjacent portion of said body and forming therewith a resultant shoulder; a retaining member for closing said lateral opening and having a collar surrounding said shank; and a nut having threaded engagement with said shank and adjustable thereon for releasably clamping said collar to said body and thereby securing said retaining member in position and closing said lateral opening.

4. A connecting device for a rope, cable, or like element having an enlargement at its connection end, said device comprising a body formed with a longitudinal passage for accommodating the end portion of said element adjacent said enlargement, a chamber for receiving said enlargement and a lateral opening through which said enlargement can be introduced into said chamber; a retaining member for closing said lateral opening and having at one of its ends a collar surrounding a portion of said body adjacent the outer end of said passage, and having at its other end a projection extending within said chamber and abutting an inner wall portion thereof adjacent said lateral opening; and means for securing said retaining member to said body with the collar and projection in the correlative positions specified.

5. A connecting device for a rope, cable, or like element having an enlargement at its connection end, said device comprising a body formed with a longitudinal passage for accommodating the end portion of said element adjacent said enlargement, a chamber for receiving said enlargement and a lateral opening through which said enlargement can be introduced into said chamber; a retaining member for closing said lateral opening and having at one of its ends a collar surrounding a portion of said body adjacent the outer end of said passage, and having at its other end a projection extending within said chamber and abutting an inner wall portion thereof adjacent said lateral opening; and means for securing said retaining member to said body with the collar and projection in the correlative positions specified, said means including a set screw threaded into said body and adapted to bear against the retaining member projection.

6. A connecting device for a rope, cable, or like element having an enlargement at its connection end, said device comprising a body formed with a longitudinal passage for accommodating the end portion of said element adjacent said enlargement, a chamber for receiving said enlargement and a lateral opening through which said enlargement can be introduced into said chamber, said body being also formed with a longitudinally extending slot providing a lateral opening communicating with said passage whereby said element can be introduced laterally into said passage; a retaining member for closing said lateral opening and said slot and having a collar surrounding said element and adapted to surround a portion of said body; and means cooperable with said collar and said body for clamping said collar to said body, there being an abutment in said device cooperable with said enlargement when said element is under tension.

7. A connecting device for a rope, cable, or like element having an enlargement at its connection end, said device comprising a body formed with a longitudinally extending passage for receiving the end portion of said element, a chamber communicating with said passage and being of larger diameter than the passage, a transverse shoulder in said body at the junction of the passage and chamber, a slot communicating with said passage throughout its length, a lateral side opening communicating with said chamber; and a retaining member for closing said slot and said lateral side opening and having a shoulder adapted to align with the shoulder in the body whereby the thrust of said enlargement will be borne jointly by the two said aligned shoulders when said element is tensioned.

8. A connecting device for a rope, cable, or like element having an enlargement at its connection end, said device comprising a hollow body having a slot and opening in its side communicating with the hollow portion, said enlargement being insertable and removable from said hollow portion by way of said slot and opening respectively and means for retaining said element and enlargement against movement from said hollow portion, said means comprising a member having a portion for closing said slot and opening and an open portion surrounding a part of said body, and a part for securing said member to said body.

9. The combination with a rope, cable, or like element having an enlargement at its connection end, of a device adapted for attachment to and detachment from said element and enlargement without removing the enlargement from said element, said device comprising a body having a seat for said enlargement; and a retaining member adapted to be secured to said body for preventing displacement of said enlargement from said seat, said retaining member having an eye portion or collar surrounding a part of said body and also surrounding said element, the inside diameter of said eye portion being smaller than said enlargement.

10. The combination with a rope, cable, or like element having an enlargement at its connection end, of a device adapted to be detachably connected to said element, said device comprising a body having a seat for said enlargement and having a threaded shank; a retaining member adapted to be secured to said body for preventing displacement of said enlargement from said seat, said retaining member having an eye portion or collar surrounding said element and fitting over said shank, the inside diameter of said eye portion being smaller than said enlargement; and a nut adapted to have threaded connection with said shank for clamping the collar to said body, said nut surrounding said element.

11. A connecting device for a rope, cable, or like element having an enlargement at its connection end, said device comprising a body formed with a longitudinal passage for accommodating the end portion of said element adjacent said enlargement, a chamber for receiving said enlargement and a lateral opening through which said enlargement can be introduced into said chamber; a retaining member having a bearing portion adapted to be positioned within said chamber between the enlargement on said element and the longitudinal passage in said body; and means for securing said retaining member to said body, the bearing portion of said retaining member being slotted longitudinally for accommodating the connection end portion of said element.

12. A connecting device for a rope, cable, or like element having an enlargement at its connection end, said device comprising a body formed with a longitudinal passage for accommodating the end portion of said element adjacent said enlargement, a chamber for receiving said enlargement, a first lateral opening in one side of said body and communicating with said chamber adjacent one end thereof, a second lateral opening in the opposite side of said body and communicating with said chamber adjacent the other end thereof, a part of said second lateral opening being in staggered overlapping relation to the first lateral opening whereby the enlargement on said element can be passed completely through the overlapping parts of said openings and then be inserted back through the second lateral opening into said chamber; a retaining member having a bearing portion adapted to be positioned within said chamber between the enlargement on said element and the longitudinal passage in said body and in axially spaced relation to said longitudinal passage; and means for securing said retaining member to said body.

AMOS LEA KELTNER.